Nov. 29, 1960       R. E. NOVKOV       2,961,743
ADJUSTABLE CHIP BREAKER
Filed Oct. 4, 1957

INVENTOR.
RAYMOND E. NOVKOV
BY
*J. William Freeman*
ATTORNEY

United States Patent Office 2,961,743
Patented Nov. 29, 1960

2,961,743

ADJUSTABLE CHIP BREAKER

Raymond E. Novkov, Akron, Ohio, assignor to Manchester Machine & Tool Co., Akron, Ohio, a corporation of Ohio Filed Oct. 4, 1957, Ser. No. 688,306

6 Claims. (Cl. 29—96)

This invention relates to the art of cutting tools and in particular has reference to the adjustment of chip controlling elements that are normally employed in association with such cutting tools.

In the known prior art of cutting tools, it has long been known that the chip that is cut from revolving stock can be controlled as to size and breaking by the use of a chip breaker. Normally, chip breakers of this type include a wear surface inclined to the cutting edge so that the chip will in effect roll up the inclined surface to form into a continuous spiral that is easily removed.

In the art of chip breaking, it has been found that the perfect chip will resemble a figure 9 so as to have one complete curl provided in the same before breaking of the chip. While it is entirely possible to employ chip breakers of the known prior art in machining operations involving continuous operation on an article, it has been found that in many cases where the cutting tool is being employed repetitively on successive pieces of stock, that the hardness or brittleness of the stock will change from piece to piece with the result that it frequently happens that the chip formation will change during the machining operation.

The above condition can result in a detrimental operation of the cutting tool since a chip that is too long in nature is disadvantageous while a chip that breaks off too quick so as to be extremely short, is also disadvantageous.

In the prior art when a situation of the above type has been encountered, it has been found necessary to stop the machine and reset the angle or distance of the chip breaker, with this normally being accompanied by unloosening the screws that retain the same in place and then repositioning the device so as to cause a different type of chip to be created.

It is of course manifest that the above type of adjustment is at best time consuming and accordingly, costly. Additionally, this prior art method has the disadvantage that the same can only accomplish the result by "cut and try" methods, with the result that even upon resetting of the chip breaker angle, the chip created may not be satisfactory with the result that one or more additional resetting attempts must be made before proper accuracy is obtained.

It has been discovered that if the chip breaker itself is rotatably journalled on the tool body per se and if means are provided to facilitate rotation of the chip breaker relatively of the tool body during the cutting operation, that the size and form of the chip created can be accurately controlled during the cutting operation without stopping of the machine. Thus, while the cutting is actually occurring, the chip breaker can have its angularity adjusted either towards or from the cutting edge so as to result in the creation of the desired form of chip element.

It accordingly becomes a principal object of this invention to provide a cutting tool having a chip breaker and being characterized by the presence of means for adjusting the chip breaker with respect to the cutting edge of the tool per se during operation of the same.

It is a still further object of this invention to provide an adjustable chip breaker of the character described that is characterized by an extreme ruggedness of construction as well as a minimum number of component parts with the result that a highly efficient and low-cost tool is provided that will create at all times during cutting, the proper size and form of chip.

These and other objects of the invention will become more apparent upon a reading of the following brief specification, considered and interpreted in the light of the accompanying drawings.

Figure 1:
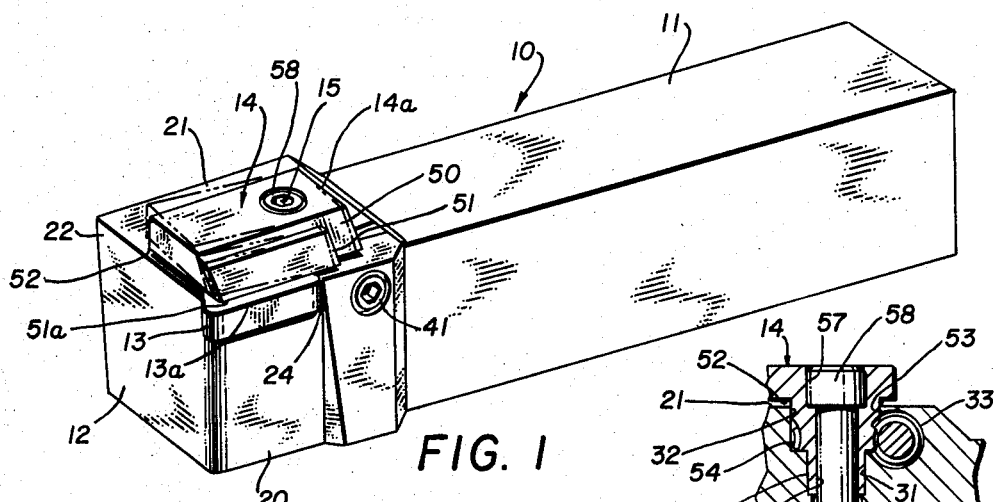
Figure 1 is a perspective view of the improved cutting tool and showing the chip breaker in full and chain-dotted line positions.

Referring now to the drawings and in particular to Figure 1, it will be seen that the cutting tool, generally designated by the numeral 10, includes a shank portion 11 and a head portion 12, with the head portion 12 receiving thereon a cutting bit 13 and a chip breaker that is generally indicated by the numeral 14; the arrangement being such that adjustment of the chip breaker 14 around a pivot point 15 so as to vary the angle between the chip breaker and the cutting bit is facilitated by use of a wrench 16 (see Figure 2) applied to the rear-most portion of the head 12 as will presently be described.

Figure 3:
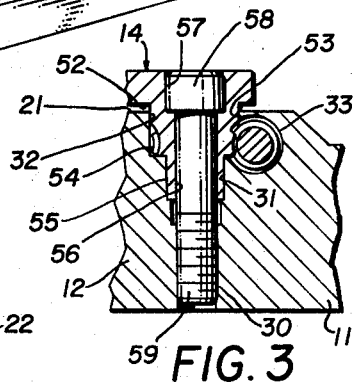
Figure 3 is a sectional view taken on the lines 3, 3 of Figure 2.

Considering first the structure of the head portion 12, it will be seen that the same includes a front face 20, a top face 21, and rear face 22, with seat 24 being defined by the front and top surfaces 20 and 21, respectively, so as to receive therein the cutting bit 13. In this regard, the seat 24 has convergent wall surfaces that engage with the triangular shaped bit 13 so as to seat the same in non-rotatable relationship within the seat 24. Thus, with the bit seated as just described, the seat will be retained in place during operation by the contact of surface 51a thereof with chip breaker 14. Additionally, and as best shown in Figure 3, the top face 21 includes a tapped aperture 30 that is counter-bored as at 31 and 32, for coaction with certain components of the chip breaker 14 as will presently be described. In this regard, the center line of bore 30 defines the pivot point 15. In addition to the aforementioned tapped aperture 30, a second tapped aperture 33 extends inwardly from rear surface 21 as is best shown in Figure 2 of the drawings, with the inward end portion 33a thereof preferably being threaded as is shown in the perspective view of Figure 2.

Figure 2:
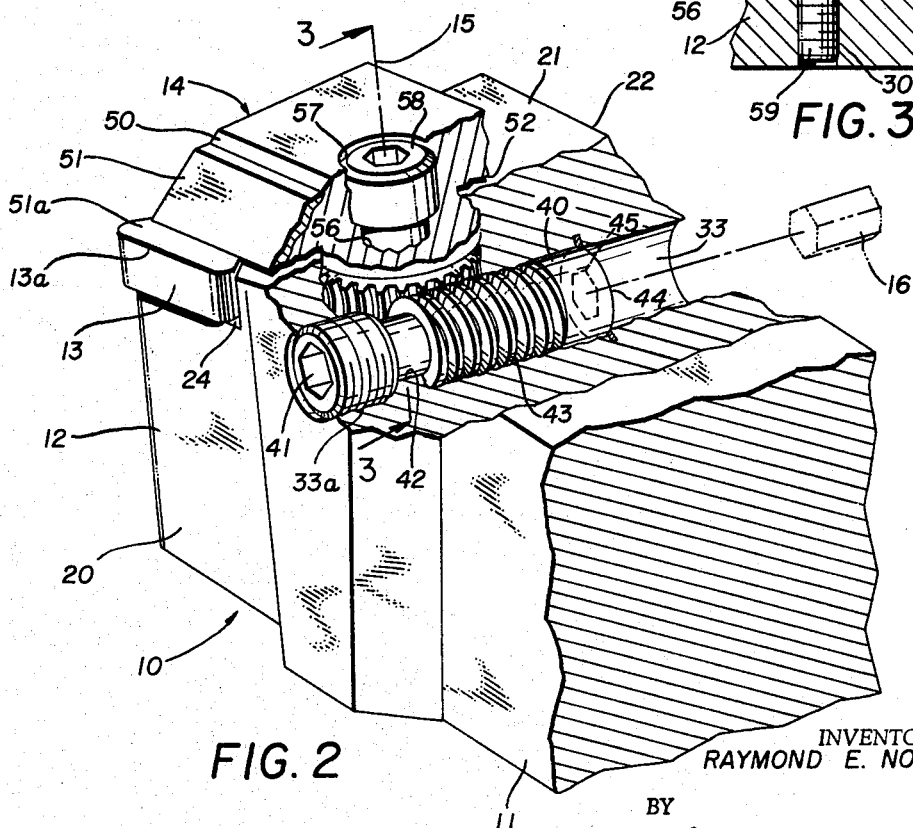
Figure 2 is a perspective view, partly broken away and in section, and showing the mechanism for adjusting the chip breaker.

Received within the aperture 33, as shown in Figure 2, is a set screw 41 against which is received a worm element indicated generally by the numeral 40 and preferably including a reduced neck portion 42, a worm portion 43, and an axial end portion 44, that is provided with an axially extending bore 45 of hexagonal cross-sectional configuration within which the wrench 16 may be fitted to effectuate impartation of rotational movement to the gear member 40. It is to be understood that the contact between element 40 and screw 41 is optional with other means being capable of substitution to prevent axial shifting of element 40. Similarly, the bore 33 is shown as having a lesser diameter than the diameter of worm portion 33, and in this regard it is to be understood that if desired the bore 33 could be made the same diameter as the worm portion 43 so as to permit axial insertion of the worm portion 43 to the position shown in Figure 2. In such instances, a collar could be either press fit or otherwise secured in the enlarged bore to prevent axial displacement of the worm portion 43.

Turning now to the consideration of the chip breaker 14 per se, it will be seen that the same is of generally blocklike configuration and includes an inclined frontal surface 50 that has preferably applied thereon a hardened carbide wear strip 51 that actually forms the chip breaking surface of the member. Additionally, the member 14 is shown having the underface 52 (Figure 3) thereof providing with the depending boss 53, with this boss 53 including a worm gear 54 and a cylindrical portion 55; the arrangement being such that when the parts are positioned as shown in Figure 3, the worm gear 54 will mesh with the worm segment 43 of member 40, while the cylindrical portion 55 will be rotatably journalled and seated within the counter-bore 31. Also, the member 14 is provided with a bore 56 that has a counter-bored aperture as at 57 so as to receive a bolt 58, the threaded end portion 59 of which engages the threaded bore 30 as is clearly shown in Figure 3 of the drawings. In this regard, it will be noted, that in the preferred embodiment of the invention, a slight clearance is provided between the surfaces 52 of chip breaker 14 and top surface 21 of head portion 12. It is to be understood that these surfaces could be in coplanar relationship with each other, if desired, but the preferred embodiment contemplates a slight spacing as is shown in the drawings.

Thus, in the preferred embodiment shown, the undercut surface 52 can engage the surface 51a of bit 13 and thus retain the same in seat 24.

Similarly, the bore 56 is shown disposed in close proximity with edge surface 14a in the preferred embodiment of the invention so as to preferably impart an eccentric rotation thereto. In this manner, the angular disposition between edge surfaces 51a and 13a, that are provided on members 51 and 13 respectively, will change at a far greater rate than if the bore 56 were located medianly between the longitudinal edges of the chip breaker 14.

In use or operation of the improved cutting tool, it will first be assumed that the component parts have been assembled in the condition of Figure 1 and further that the tool has been chucked in a proper machine tool so as to have the cutting edge 13a effectuate a cut on a revolving work piece. In the full line condition of Figure 1, the edge surfaces 51a and 13a are disposed in substantially parallel relationship with each other. However, if it is desired to move the edge portion 51a to the chain-dotted line position of Figure 1, it is merely necessary that the wrench 16 be inserted within hexagonal bore 45 and rotational turning force be applied to the worm member 40. This rotational force will result in equivalent rotational movement of edge surfaces 51a to the chain-dotted line position of Figure 1 wherein the same will be disposed at an acute angle with respect to edge surface 13a. From this position, it is apparent that rotation of wrench 16 in the opposite direction will cause return of the edge 51a to the full line position of Figure 1 and accordingly, adjustment of a reciprocatory nature can be effectuated in either direction so as to vary the angular disposition between edge portions 51a and 13a.

As a further note with regard to the construction of the preferred embodiment, it will be noted that the preferred embodiment illustrated herein shows the teeth of the worm gear 53, 53 being concave in cross-sectional configuration so as to engage a greater portion of the worm 43 and thus assure a more positive driving force. It is to be understood that a similar concave configuration could be imparted to the teeth of worm section 43 to even further improve the degree of mesh between the worm elements 43 and 53.

It has been shown in the preceding paragraphs how there has been provided a new and improved type of cutting tool that features the use of an adjustable chip breaker, with the chip breaker being adjustable under actual cutting conditions so as to achieve a desired chip at all times. It has been further shown how the tool can be moved in a direction either towards or from the cutting edge so as to at all times provide adjustment in either direction as required.

While a full and complete disclosure of the invention has been set forth in accordance with the dictates of the Patent Statutes, it is not intended that the invention be so limited. Accordingly, where indicated, equivalent parts may be employed with equivalent results. In this regard, it is to be understod that the invention contemplates the fact that the underface 52 of chip breaker 14 could be provided with a worm rack formed integrally thereon and meshing with the worm section 43. In this manner worm gear 54 could be eliminated. In this use an auxiliary clamp could be employed.

Accordingly, modifications of the invention may be resorted to without departing from the spirit hereof or the scope of the appended claims.

What is claimed is:

1. A cutting tool of the character described, comprising; a tool holder having a seat provided therein; a cutting bit received in said seat with said cutting bit having a cutting edge; a chip breaker carried by said tool holder and having a chip engaging surface overlying said bit when the same is received in said seat with said chip engaging surface being engageable with said bit adjacent said cutting edge thereof, whereby said bit may be retained in said seat by said chip breaker; and adjustment means releasably interconnected with said chip breaker; said adjustment means positively shifting said chip breaker in opposite directions, whereby said chip engaging surface thereof may be selectively shifted towards and from said cutting edge of said tool; said adjustment means controlling the path of shifting movement of said chip breaker during shifting thereof by said adjustment means.

2. A cutting tool of the character described, comprising; a tool holder having a seat provided therein; a cutting bit received in said seat with said cutting bit having a cutting edge; a chip breaker carried by said tool holder and having a chip engaging surface overlying said bit when the same is received in said seat with said chip engaging surface being engageable with said bit adjacent said cutting edge thereof, whereby said bit may be retained in said seat by said chip breaker; and adjustment means; releasably interconnected with said chip breaker; said adjustment means positively shifting said chip breaker in opposite directions, whereby said chip engaging surface thereof may be selectively shifted towards and from said cutting edge of said tool said adjustment means including a gear conection between coacting gear members carried by said chip breaker and said tool holder.

3. A cutting tool of the character described, comprising; a tool holder having a seat provided therein with said tool holder also having top, front and rear surfaces and with said top and rear surfaces of said holder being provided with inwardly extending bores; a cutting bit received in said seat and having a cutting edge overlying said front surface; said cutting bit having an upper surface that is elevated above said top surface of said holder; a chip controller having a projection thereof rotatably journaled in said bore of said top surface of said holder; said chip controller having a chip engaging surface disposed on contact with said upper surface of said bit; and adjustment means carried by said body and rotating said chip controller about its point of journaling in said bore.

4. A cutting tool of the character described, comprising; a tool holder having a seat provided therein with said tool holder also having top, front and rear surfaces and with said top and rear surfaces of said holder being provided with inwardly extending bores; a cutting bit received in said seat and having a cutting edge overlying said front surface; said cutting bit having an upper surface that is elevated above said top surface of said holder; a chip controller having a projection thereof rotatably journaled in said bore of said top surface of said holder; said chip controller having a chip engaging surface disposed on contact with said upper surface of said bit; and adjustment means carried by said body and rotating said chip controller about its point of journaling in said bore; said adjustment means being operable from a point interiorly of said bore of said rear surface.

5. A cutting tool of the character described, comprising; a tool holder having a seat provided therein with said tool holder also having top, front and rear surfaces and with said top and rear surfaces of said holder being provided with inwardly extending bores; a cutting bit received in said seat and having a cutting edge overlying said front surface; said cutting bit having an upper surface that is elevated above said top surface of said holder; a chip controller having a projection thereof rotatably journaled in said bore of said top surface of said holder; said chip controller having a chip engaging surface disposed on contact with said upper surface of said bit; and adjustment means carried by said body and rotating said chip controller about its point of journaling in said bore; said adjustment means including a first gear member carried on said projection of said chip controller and a second gear member rotatably journaled in said bore of said rear surface of said body; said first and second gears being meshed, whereby rotation of said second gear will rotate said chip controller relatively of said tool holder.

6. The device of claim 5 further characterized by the fact that said first and second gear members are worm gears.

References Cited in the file of this patent

UNITED STATES PATENTS

| 727,440 | Rabiger | May 5, 1903 |
| 1,415,578 | Knoop | May 9, 1922 |
| 1,715,844 | Kienzl | June 4, 1929 |
| 2,173,772 | Timmons | Sept. 19, 1939 |
| 2,181,023 | Moore | Nov. 21, 1939 |
| 2,457,469 | Hillman | Dec. 28, 1948 |
| 2,484,480 | Anderson | Oct. 11, 1949 |
| 2,799,079 | Brigner | July 16, 1957 |
| 2,860,402 | Proksa | Nov. 18, 1958 |

FOREIGN PATENTS

| 1,041,370 | France | May 27, 1953 |
| 604,235 | Germany | Oct. 17, 1934 |